United States Patent [19]

Johne

[11] Patent Number: 5,775,857
[45] Date of Patent: Jul. 7, 1998

[54] TOOL-HOLDER

[75] Inventor: Frank Johne, Lohne, Germany

[73] Assignee: Johne & Co. Präzisionswerkeuge GmbH, Dorsten, Germany

[21] Appl. No.: 666,478

[22] PCT Filed: Dec. 23, 1994

[86] PCT No.: PCT/DE94/01541

§ 371 Date: Jun. 24, 1996

§ 102(e) Date: Jun. 24, 1996

[87] PCT Pub. No.: WO95/17275

PCT Pub. Date: Jun. 29, 1995

[30] Foreign Application Priority Data

Dec. 23, 1993 [DE] Germany ............ 43 44 042.8
Jan. 28, 1994 [DE] Germany ............ 44 02 483.5

[51] Int. Cl.⁶ .................... B23B 31/00; B23C 5/26
[52] U.S. Cl. ............. 409/234; 279/143; 408/143; 408/239 A

[58] Field of Search .............. 409/232, 234; 408/57, 59, 143, 238, 239 A; 279/143, 145

[56] References Cited

U.S. PATENT DOCUMENTS

| 4,863,323 | 9/1989 | Glaser | 409/232 |
| 5,030,047 | 7/1991 | Pfalzfraf | 409/234 |

FOREIGN PATENT DOCUMENTS

| 2545023 | 11/1984 | France | 409/232 |
| 2831660 | 3/1979 | Germany | 409/232 |
| 4110857 | 10/1992 | Germany | 279/143 |
| 91/11282 | 8/1991 | WIPO . | |

*Primary Examiner*—Daniel W. Howell
*Attorney, Agent, or Firm*—Cohen, Pontani, Lieberman, Pavane

[57] ABSTRACT

A tool holder in which a part to be clamped, for instance in a machine spindle, has an elastic portion on its outer side.

27 Claims, 7 Drawing Sheets

TOOL-HOLDER

BACKGROUND OF THE INVENTION

1. Field of the Invention

The present invention relates to a device for holding tools or the like.

2. Description of the Prior Art

A tool holder is known (German reference DE 34 36 733 C2) in which a part referred to as clamping pin consists of a substantially cylindrical shank having a flange and of a so-called conical pressure sleeve placed thereon and forming a guide surface on its outer side. This sleeve is to be held immovably between the flange and a securing element on the rear end of the shank. The sleeve has a conical outer surface which is adapted to the conical bore of a spindle head, said surface fitting in form-locked manner within the conical bore. At the larger end of the conical pressure sleeve there are annular grooves that form a region of elastic deformation which lies on the flange of the shank. Upon the clamping of a tool, a tightening mechanism acts on the shank. The flange is applied, upon an axial movement, against the end surface of the spindle head. In this position of application, the conical pressure sleeve is to be pressed axially by the flange, whereby its region of deformation is bulged and so deformed within the conical bore of the spindle head that a radial component of force acts on a cylindrical collar on the shank so as to center the tool. There are contradictions and opposing demands with this device which cannot be satisfied simultaneously.

SUMMARY OF THE INVENTION

Therefore, the present invention is directed at the problem of creating a device for holding a tool or a tool holder or the like which, while suitable for automatic tool replacement, is of great stiffness and at the same time has a high accuracy of concentricity. The tool holder should be able to offer advantageous properties, such as are desired in a new standard, even in embodiments in accordance with previously applied standards without changes in spindles and tools having to be effected. Other problems inherent herein with which the invention is concerned will become evident from the description of the preferred embodiments.

In a tool holder device of the aforementioned type, the invention provides that a flange part having an annular surface intended for flat application consists of a piece having a sleeve body which can be inserted into the receiver and which, with an outer shape which is adapted to the shape of the receiver, has as at least one elastic portion capable of bearing a load which is located between a region adjacent to the flange part and a region adjacent to its rear end.

Such a tool holder is characterized by a number of important advantages. Upon the insertion of a work spindle or another machine part into the receiver, there is obtained, with dependable flat application, a clamping of the work spindle in the receiver, merely by the build-up of pressure and without disadvantageous movements. Even in the case of thermal strains, excellent radial contact is maintained. Extremely favorable actions of force are obtained without an interlocking such as is necessary in other tool holder. With the invention there is thus created an interface. i.e. the connection between a conical part and a receiver, in particular of the spindle of a machine tool, which satisfies even high demands as to accuracy and stability. The hollow-shank design in accordance with the new standard which has been arrived at after lengthy investigations and consultations requires fundamentally changed developments not only with respect to the tool but of course also on the part of the machine, which means a corresponding expense and new purchases. The invention affords advantages which are obtained by the hollow-shank interface for the previously customary interfaces which are used in large number, particularly ones with a steep cone, without new parts or even merely modifications on the machine side being necessary for this.

By an elastic load-bearing part of the sleeve body there are to be understood all embodiments which make it possible, with fixed flat application of the flange part connected to the sleeve body against its mating surface to produce and maintain a dependable contact between the sleeve body and the conical receiver. Other details with respect hereto will be explained further below.

The flange part of the sleeve body and a flange part on the front part of the tool holder can together form the flange. There may be concerned here a flange consisting of a single piece or flange parts which are connected or assembled to each other. The flange parts can, in particular, be bolted, welded or bonded to each other. An insert, in particular of vibration-damping material, can be provided between the flange parts.

In one embodiment of the invention, the sleeve body itself forms the extension of the tool holder, it being developed at its rear end for the action of an outer clamping device. The sleeve body can, for instance, have a threaded hole into which a clamping member on the machine side can be screwed.

In another advantageous embodiment of the tool holder, a shank connected with the front part of the tool holder or consisting of one piece with the front part extends into the sleeve body, which then, together with the sleeve body, forms the extension which can be inserted into the receiver. The shank and the sleeve body can be attached to each other in the region of their rear ends, for which there are various possibilities. A rigid or friction-locked connection may be present. In particular, a permanently elastic or permanently plastic material can be provided between the shank and the sleeve body. In this way, a sealing and at the same time a damping are obtained.

The sleeve body and a part of the front part extending into it are advisedly connected to each other in the region of the flange. The connection can be permanent or detachable.

In another embodiment, a threaded connection is present between the front part or a shank connected to it and the sleeve body, so that the two parts can be screwed together. There are various places where such a threaded connection can be arranged. In particular, the threaded connection is provided on the inside in the region of the flange.

For the development of the sleeve body with its elastically loadable portion there are various possibilities. Thus, in one advantageous embodiment, the sleeve body can have, in the region of its elastically loadable portion, a larger size than the desired size of the conical receiver for the extension. Over a certain length of the sleeve body, and in particular in the central region thereof, it can have a diameter which is slightly greater than the diameter which would be present in the case of an outer cone corresponding precisely to the inner cone of the holder. The sleeve body is advantageously barrel shaped in the region of the larger dimension. Upon the insertion of the tool holder into the receiver, the elastic portion experiences deformation in the sense of an adaptation to the existing size of the receiver.

In another embodiment of the tool holder there is provided within the sleeve body a device by means of which a clamping force can be exerted on the sleeve body. The device is connected with an attack part, present on the rear end of the tool holder, for an outer clamping device and is actuatable by the latter. The outer clamping device can in particular be a device of known type on the machine side.

In a further embodiment, the device has a clamping bolt connected with the attack part for the outer clamping device. The bolt bears an abutment for at least one clamping element which acts on the sleeve body. The clamping bolt can in particular extend into a hollow space in a shank of the front part of the tool holder.

For the inner loading of the sleeve body in order to obtain the clamping condition, there is provided, to particular advantage, a clamping element which acts by its outer circumference on the sleeve body. This results in a very uniform action on the sleeve body. The clamping element can, in particular, be a set of Belleville springs or the like.

The device for the internal loading of the sleeve body can also be distributed at uniform angles apart over the circumference of a clamping bolt, the abutment and the inner ends of the clamping elements which are in contact with it being beveled or conical.

Further details, features, and advantages of the invention will become evident from the following description of embodiments, the corresponding drawing, and the claims.

BRIEF DESCRIPTION OF THE DRAWING

Identical parts or parts corresponding to each other are provided with the same reference numerals in the figures.

DETAILED DESCRIPTION OF THE PREFERRED EMBODIMENTS

Figure 1:
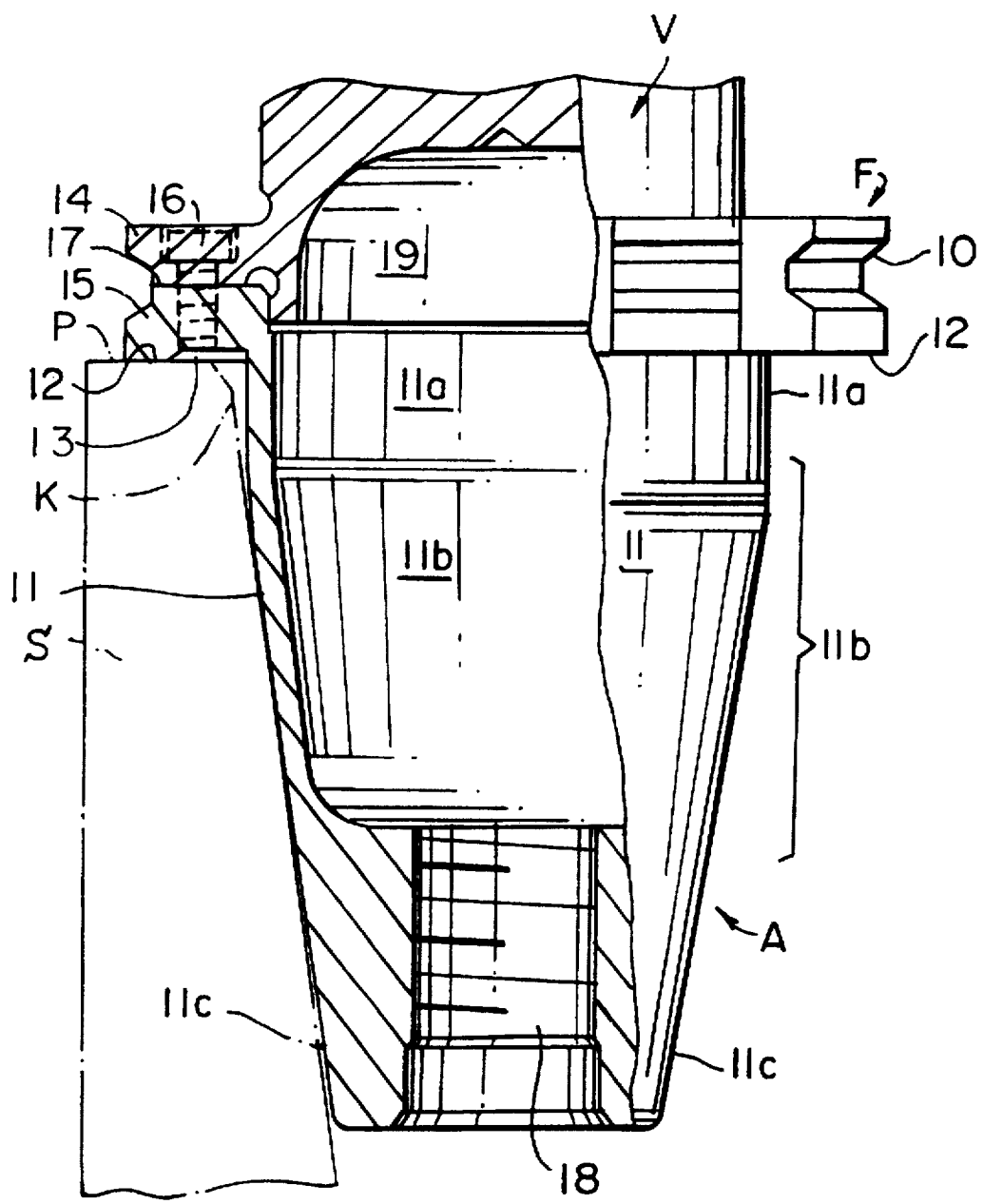
FIG. 1 shows a cross section of a first embodiment of the invention.

The tool holder shown in FIG. 1 has a front part V, shown only partially, an extension A which can be inserted into a conical receiver or inner core K of a work spindle S, indicated in dot-dash lines on one side of the figure, of a machine tool, and a flange F located between the front part V and the extension A. The flange having a gripper groove 10 for a tool change device. The front part V can be developed in many known ways in order to receive a tool, for instance a drill, a reamer, a milling cutter or the like, or else a measurement tool.

In this embodiment, the flange F consists of two flange parts 14, 15 which are attached to each other, the flange part 14 belonging to the front part V and the flange part 15 belonging to the extension A. The two flange parts 14, 15 are rigidly attached to each other by a suitable number of bolts 16 distributed over the circumference (only one is shown). Instead of being bolted together, the flange parts 14, 15 can also be welded together, bonded, or in some other manner connected to each other. Between the flange parts 14, 15 there can be an intermediate layer 17 of vibration-damping material, as indicated on the left-hand side of FIG. 1. This applies in the same way also to the other embodiments.

A collar 19 of the front part V engages into the flange part 15 of the extension A, in which connection there can be a tight fit between the two parts or else there can be a firm attachment also at this place.

The extension A is formed in this embodiment by a substantially hollow sleeve body 11 which is formed as one piece with the flange part 15. The sleeve body 11 has on its outer side a front region 11a adjacent to the flange part 15, a rear region 11c adjacent to its rear end and, in between, an elastically deformable portion or region 11b. The deformable portion 11b is oversized, in the sense of a somewhat larger diameter than the desired diameter, for instance an outside diameter adapted to the inner cone K of the spindle S. The development is advantageously such that the portion 11b is slightly barrel-shaped, the excess size of the diameter differing therefore over a lengthwise section. The front region 11a can, as shown here, advantageously be cylindrical. The rear region 11c is advisedly conical. However, this is not to be understood as limiting the invention. The desired elasticity of the portion 11b can be obtained by suitable dimensioning, in particular by selection of the wall thickness and/or selection of a suitable material. As material, steel in particular enters into consideration, although other materials are not excluded.

The rear part of the sleeve body 11 is developed for the attachment of an outer clamping device on the machine side, which device may be of a customary type. This can be done in various manners and depends on the corresponding development of the clamping device or the part thereof engaging on the tool holder. As an example, the sleeve body 11 in FIG. 1 has a recessed portion followed by a threaded hole 18 which serves for the attachment of a pulling or clamping member.

Upon the pulling of the tool holder with its attachment into the receiver K, the annular flat rear side 12 of the flange part 15 comes to rest against the flat end surface P of the work spindle S, and the sleeve body 11 experiences an outer loading in its barrel-shaped portion 11b, leading to elastic deformation radially inward. In this way there is obtained a dependable, firm seat of the extension A, formed by the sleeve body 11, of the tool holder in the receiver K.

At the transition of the sleeve body 11 or of its region 11a to the flange part 15, it is advantageous to provide an undercut or annular recess 13.

Figure 2:
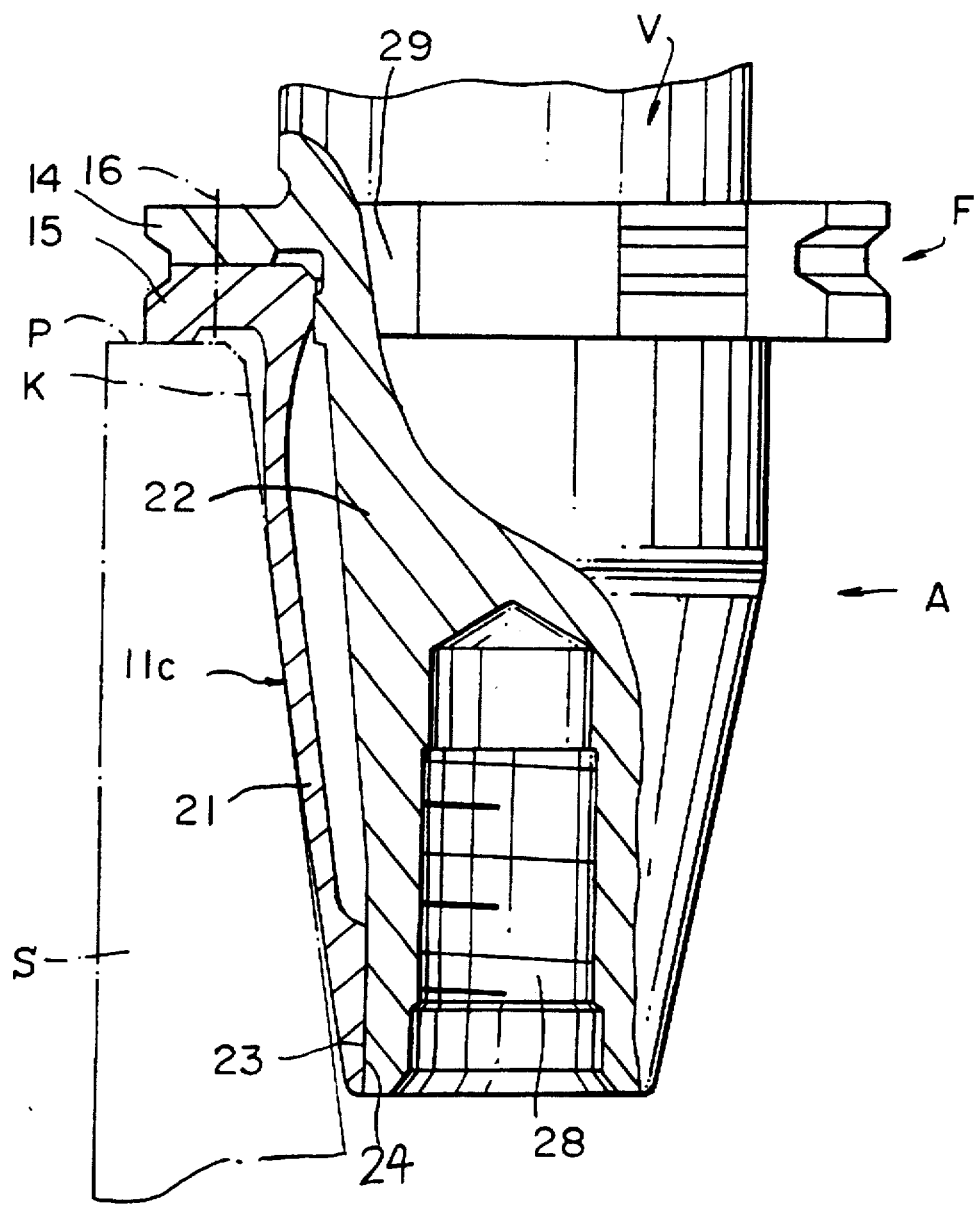
FIG. 2 shows a cross section of a second embodiment of the invention.

The embodiment shown in FIG. 2 differs from the embodiment of FIG. 1 by the fact that a shank 22 which is integral with the front part V extends into the sleeve body 21 and, together with it, forms the extension A which can be inserted into the receiver K. The shank 22 and the sleeve body 21 can be connected to each other in the region 23 of their rear ends, for instance by welding or by a force fit or the like. However, merely a fit which permits assembly or a frictional closure can also be present between the two parts, in particular in such a manner that a damping action is present. Within the region 23 a permanently elastic or permanently plastic material is also advantageously provided between the shank 22 and the sleeve body 21 as connection between the two parts, as indicated at 24. In this way, a sealing with simultaneous damping of oscillations is obtained.

A threaded hole 28 in the shank 22 serves for the engagement or a clamping member of the like, as explained in connection with the embodiment shown in FIG. 1.

In the region of the flange F, the front part V has a collar 29 which rests against a cylindrical surface within the flange part 15, in which connection a tight fit or a solid attachment can be present.

Figure 7:
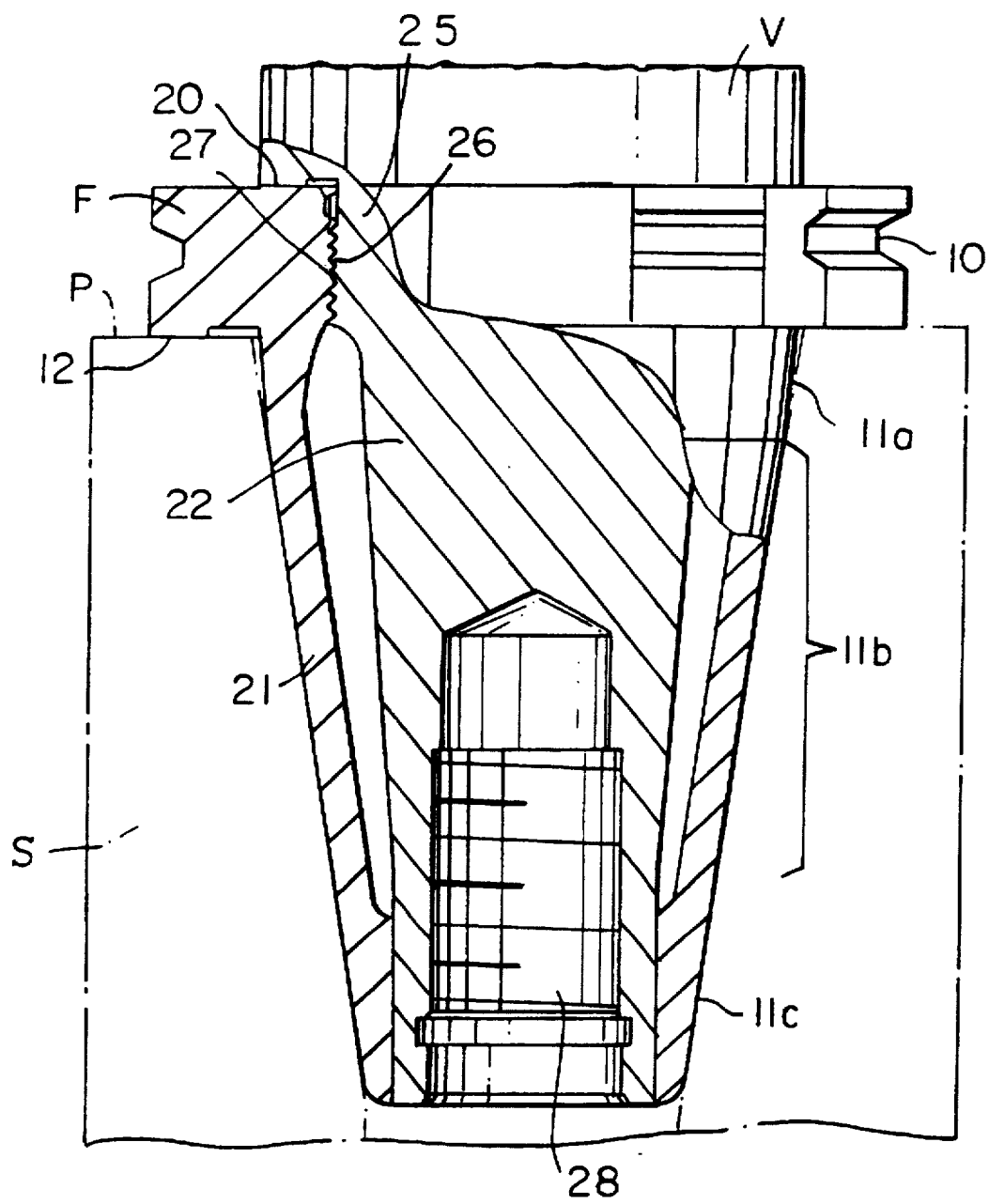
FIG. 7 shows a cross section of a seventh embodiment of the invention.

In particular, differing from what is shown in the figure, a bolting can also be provided at this place, as shown in FIG. 7.

Figure 3:
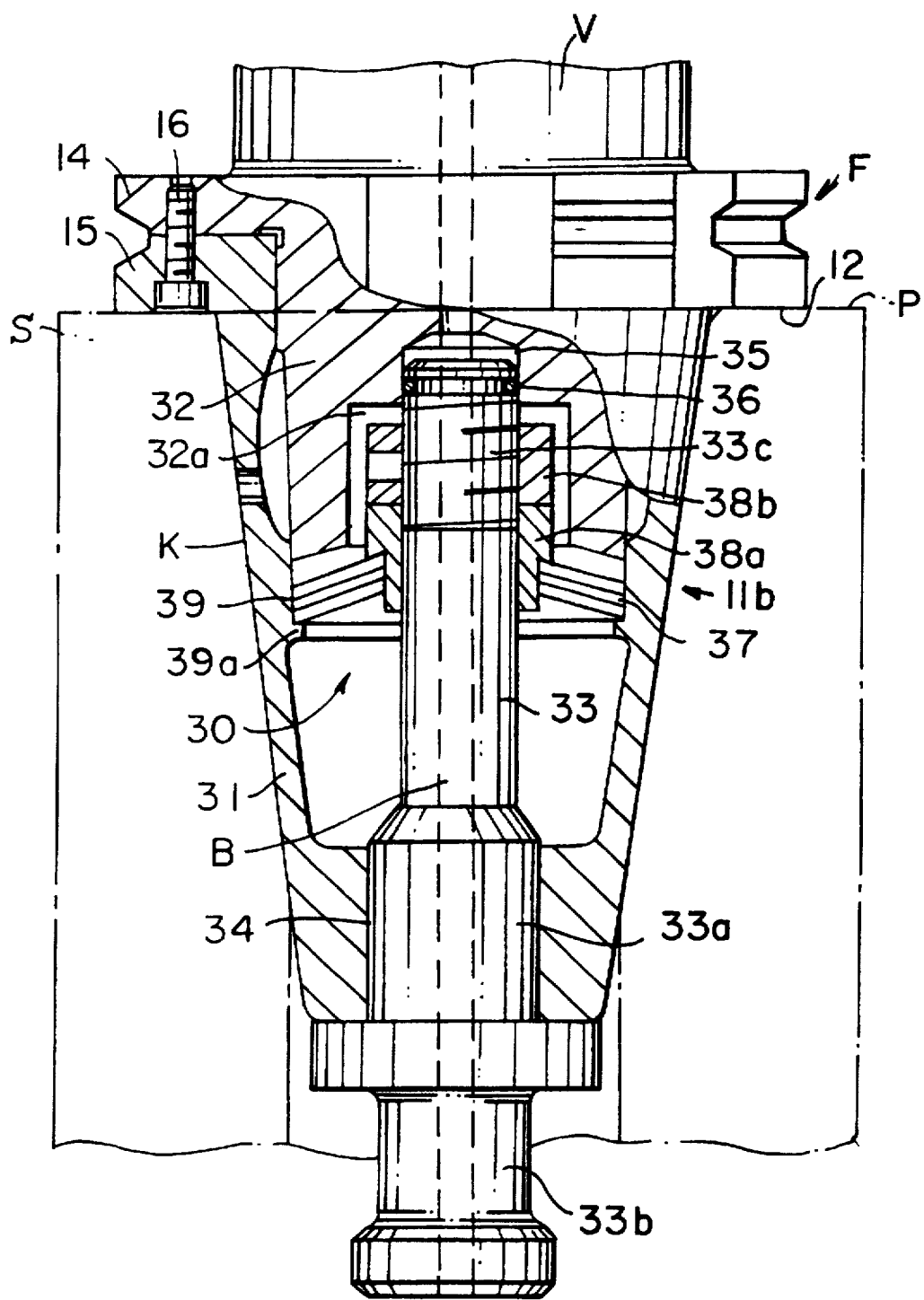
FIG. 3 shows a cross section of a third embodiment of the invention.

In the embodiment shown in FIG. 3, within a sleeve body 31 consisting of one piece with the flange part 15, there is a device 30 by means of which a clamping force can be exerted from the inside on the sleeve body 31. The sleeve body 31 has at its rear end a hole 34 as slide-guide for a cylindrical part 33a of a clamping bolt 33 which, on its rear end extending out of the sleeve body 31, has an ordinary clamping mushroom 33b part for the action of an outer clamping device. The clamping bolt 33 extends by a threaded part 33c into a hollow space 32a in a shank 32 of the front part V which extends into the sleeve body 31. On the threaded part 33c there is screwed and locked a nut 38b as support for an abutment 38a for a clamping element 37 the outer circumference of which acts on the inner side on the sleeve body 31. The clamping element in this embodiment is formed by a set of Belleville springs 37 which is arranged on a neck of the abutment 38a. The springs 37 rest against the abutment and act on the radially outer edge on a seat 39 of the sleeve body 31 which seat is limited by a shoulder 39a. The end of the shank 32 extends into the seat 39.

Upon the pulling of the tool holder with its extension A into the receiver K of the spindle by means of a machine-side clamping device acting on the mushroom 33b, the annular surface 12 of the flange part 15 comes to rest on the flat surface P of the work spindle S and as a result of the force exerted via the clamping bolt 33 and the abutment 38a on the set of Belleville springs 37, the sleeve body 31 is also loaded from the inside and, as a result of the elasticity present in it, pressed firmly against the inner cone of the receiver K. The set of Belleville springs 37 acts in this connection at the location of the seat 39 on the entire inner circumference of the sleeve body 31.

By its front end, the clamping bolt 33 engages into a bore hole 35 in the shank 32. It is sealed off from the wall of this hole by one or more sealing rings 36, so that it is possible to conduct a cooling or lubricating agent into the front part V of the tool holder and to a tool received through a bore B which extends through the entire clamping bolt 33.

Figure 4:
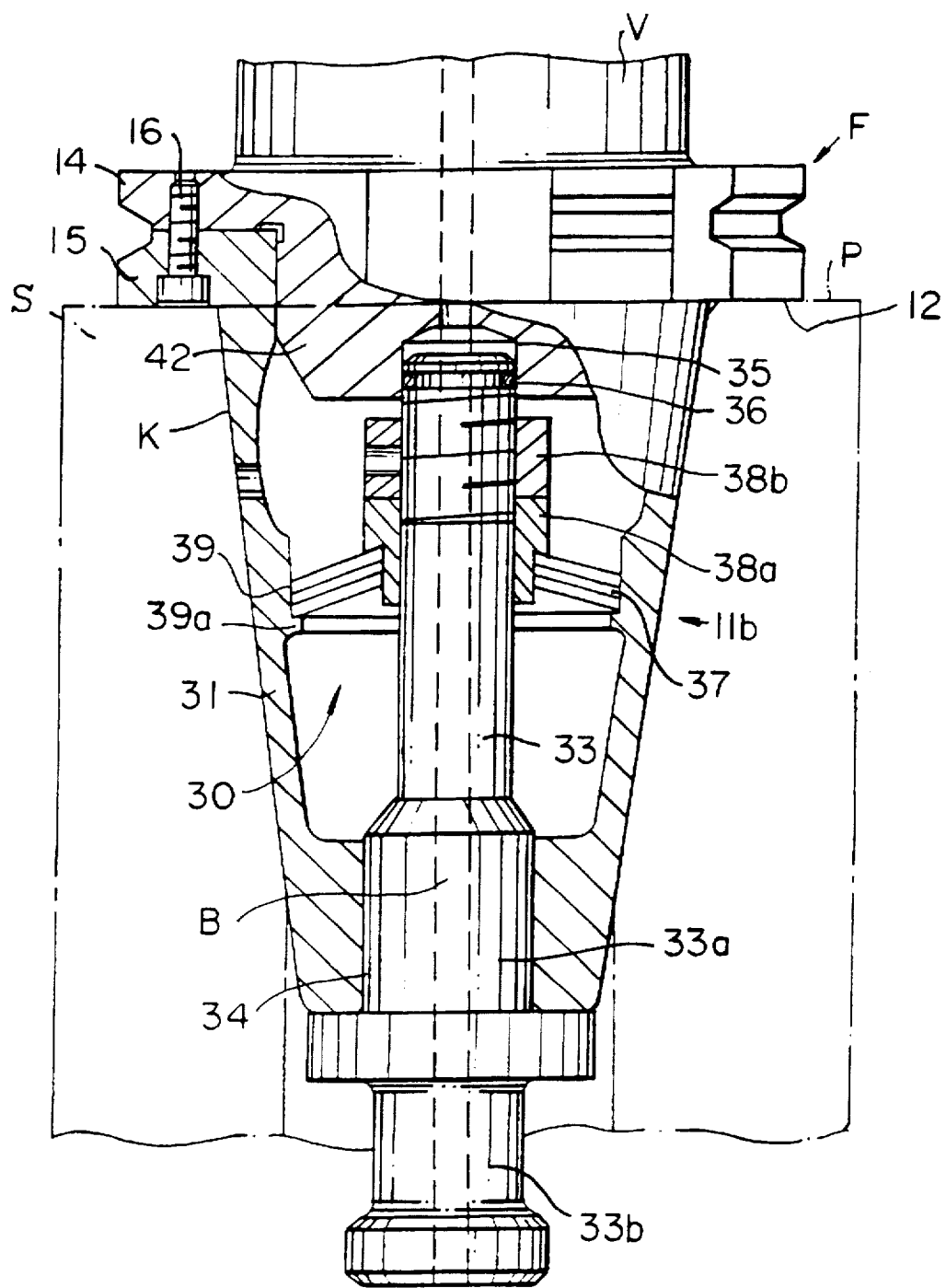
FIG. 4 shows a cross section of a fourth embodiment of the invention.

The embodiment in accordance with FIG. 4 corresponds substantially to that of FIG. 3, with the exception that the shank 32 of the front part V is shorter in this embodiment.

Figure 5:
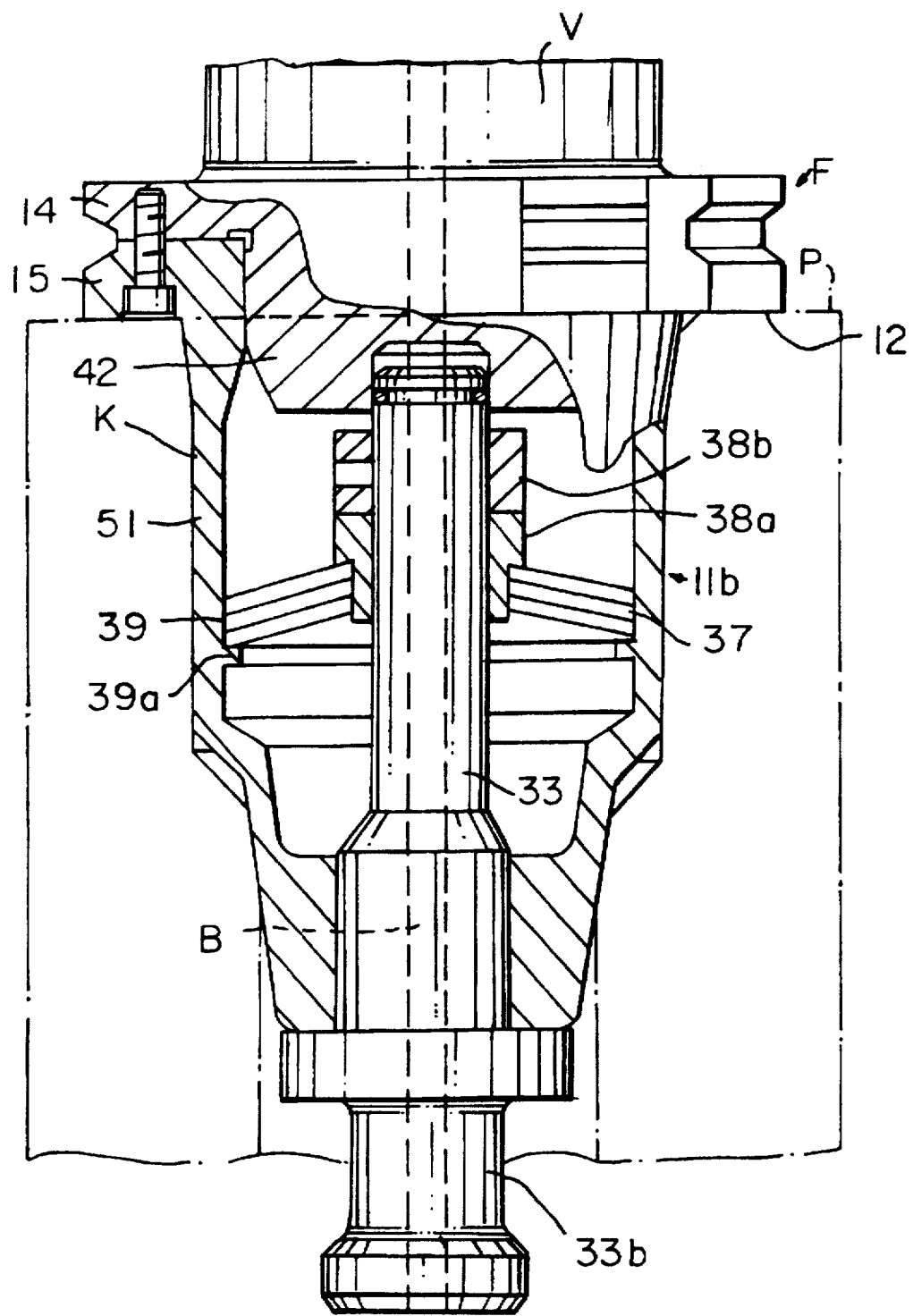
FIG. 5 shows a cross section of a fifth embodiment of the invention.

FIG. 5 serves to show that the invention enters into consideration and can be used not only for work spindles or other machine parts with a conical receiver, whether short or long cones, but also for receivers of entirely or partially cylindrical inner shape. Thus, in FIG. 5, a tool holder having a sleeve body 51 which is cylindrical at least on the outside is shown, which can be inserted into a cylindrical receiver K in the spindle S. The device 30 for the exerting of a clamping force corresponds to that of FIG. 4 or FIG. 3 so that the parts are designated with the same reference numerals.

Furthermore, in the case of a cylindrical receiver, the development can be the same or similar to that explained in connection with FIGS. 1 and 2. All of this falls within the scope of the invention.

Figure 6:
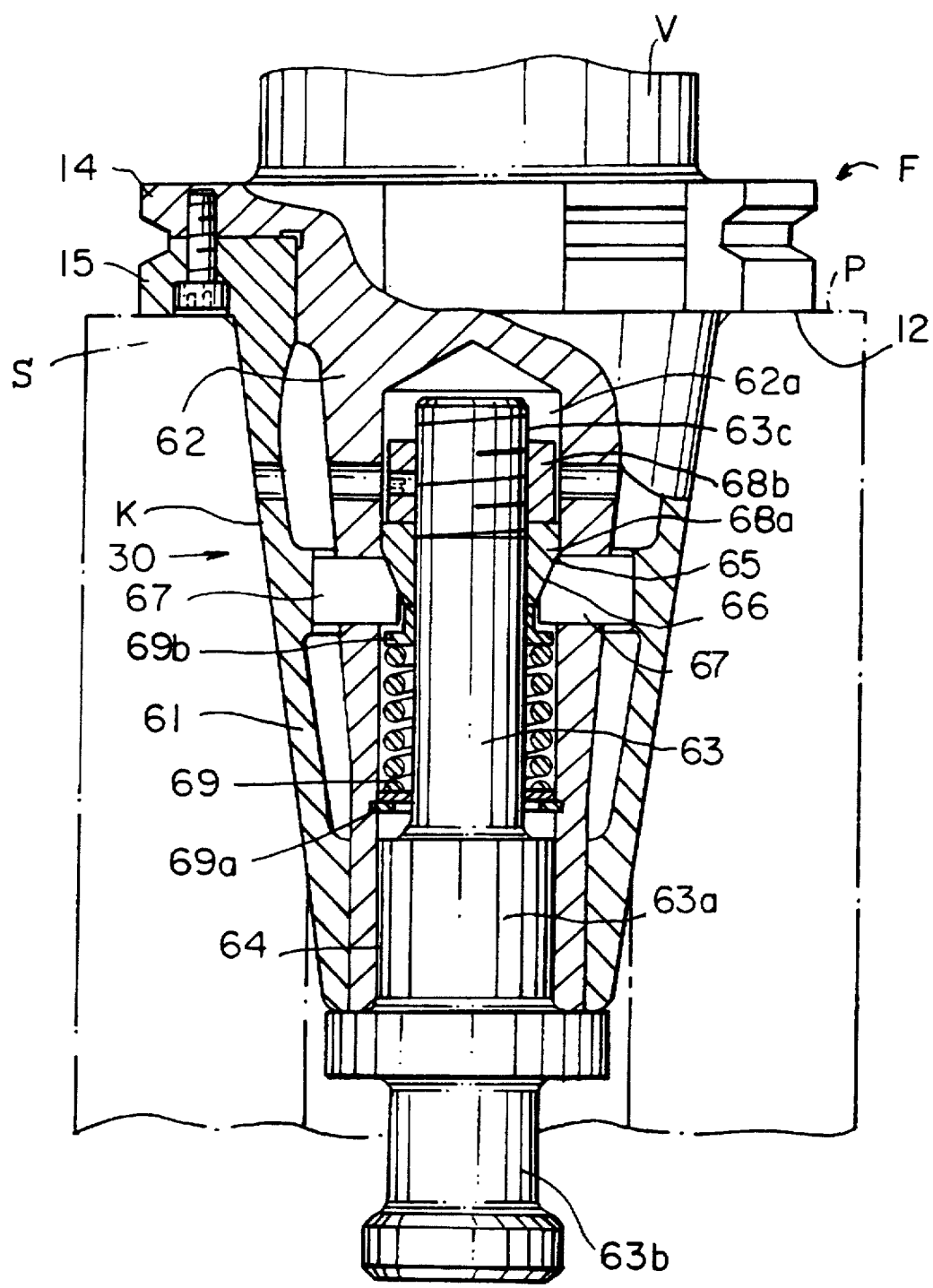
FIG. 6 shows a cross section of a sixth embodiment of the invention.

The same applies also to the embodiment in accordance with FIG. 6. Here again, there is present within a sleeve body 61, consisting of one piece with a flange part 15, a device 30 by means of which a clamping force can be exerted from the inside onto the sleeve body 61. The shank 62 extends up to the end of the sleeve body 61 and is provided on its rear end with a hole 64 as a slide-guide for the cylindrical part 63a of a clamping bolt 63 which on its rear end extending out of the sleeve body 61 has an ordinary clamping mushroom 63b for the action of an outer clamping device. The clamping bolt 63 extends by a threaded part 63c into a hollow space 62a of the shank 32. On the threaded part 63c there is screwed and locked a nut 68b as a support for an abutment 68a around which clamping elements 67 are arranged in the form of pressure pieces guided radially in recesses of the shank 62, which pressure pieces rest with conical surfaces 66 against an outer conical surface 65 of the abutment 68a. The abutment 68a is under the action of a compression spring 69 the rear end of which rests against a ring 69a and the front end of which rests against a bushing 69b which, in its turn, rests against the abutment 68a.

The clamping elements 67 engage with their radially outer ends against the sleeve body 61. The clamping process is basically the same as described above in connection with FIG. 3, the elastic clamping being effected here by means of the clamping elements 67 instead of the set of Belleville springs 37.

In the embodiments described above, the flange consists in each case of a flange part 14 connected with the front part V and a rear flange part 15 connected with the sleeve body 11, 21, 31, 41, 51 and 61. Instead of this, the flange F can, as shown in FIG. 7, also be present as a single element on the sleeve body 21, and in particular form one piece with it.

In such embodiments, the front part V rests with an annular flat surface 20 on a mating surface on the front side of the flange F. In this connection, the front part V can be connected firmly or detachably in various manners with the flange F of the sleeve body 21 or with some other place of the latter.

In particular, a threaded connection is provided between the front part or a shank which can be screwed to it so that the two parts can be screwed to each other.

One advantageous embodiment along this line is shown in FIG. 7. Here, there is present an extension 25 of the front part V which is fundamentally of cylindrical shape, which the shank 22 adjoins and which also can be considered as a transition between the front part and the shank. The shoulder is provided with an external thread 26 which is threaded into an internal thread 27 in the flange F. The annular surface 20 in this connection has applied itself firmly against the front side of the flange F. The screwing can be additionally secured whether by bonding, by one or more pins, or in some other suitable manner.

Such a threaded connection can also be the other embodiments of the tool holder. With a divided flange, as for instance in the embodiments of FIGS. 1 to 6, the inner thread can be located in the flange part 15 while the outer thread is provided at a suitable place on the front part V, for instance on a collar 19 or 25. The screws 16 can then be dispensed with. The flange parts 14, 15 can be clamped together by the threaded connection.

The means for the rotatable driving of the tool holder in question by a spindle which receives it, and thus for the transmission of the moment of rotation, have not been shown in detail. They can be of known type.

All features mentioned in the above specification or shown in the drawings are to be considered as falling under the invention, both individually and in combination, insofar as the known prior part permits this.

I claim:

1. A tool holder for holding a tool in a receiver of a machine part, comprising: a front part; an extension member that is insertable into the receiver, the extension member having an external shape essentially adapted to a shape of the receiver; and a flange located between the front part and the extension, the flange having a rear surface facing the extension member that is restable flat against an end surface of the machine part, the extension member being configured as a sleeve body that has a front portion adjacent to the flange, an elastically deformable portion adjacent the front portion, and a rear portion adjacent to the deformable portion, the deformable portion being oversized relative to the receiver, the rear portion of the sleeve body being configured to be engagable by a clamping device.

2. A tool holder according to claim 1, wherein the elastically deformable portion of the sleeve body is barrel-shaped.

3. A tool holder according to claim 1, wherein the sleeve body forms at least one part of the flange.

4. A tool holder for holding a tool in a receiver of a machine part, comprising: a front part; an extension member that is insertable into the receiver, the extension member having an external shape essentially adapted to a shape of the receiver; a flange located between the front part and the extension, the flange having a rear surface facing the extension member that is restable flat against an end surface of the machine part, the extension member being configured as a sleeve body that has a front portion adjacent to the flange, an elastic portion adjacent the front portion, and a rear portion adjacent to the elastic portion; a shank connected to the front part so as to extend into the sleeve body; a clamping bolt arranged concentrically and longitudinally moveable in the shank; and means provided between the clamping bolt and an inner circumferential surface of the sleeve body for exerting a clamping force on the elastic portion of the sleeve body, the force exerting means including an abutment arranged on the clamping bolt and a clamping element arranged on the clamping bolt so as to engage the abutment and so as to stretch the elastic portion by radial movement of an outer circumference of the clamping element.

5. A tool holder according to claim 4, wherein the shank and the front part are configured as a single piece.

6. A tool holder according to claim 4, wherein the shank has a rear end away from the front part, the shank and the sleeve body being connected together in a region of their rear ends.

7. A tool holder according to claim 6, and further comprising a permanently elastic material arranged between the shank and the sleeve body.

8. A tool holder according to claim 6, and further comprising a permanently plastic material arranged between the shank and the sleeve body.

9. A tool holder according to claim 1, wherein the front part has a portion configured to extend into the sleeve body in a region of the flange, and further comprising means for connecting together the sleeve body and the portion of the front part extending into the sleeve body.

10. A tool holder according to claim 9, wherein the connecting means includes a threaded connection between the front part and the sleeve body.

11. A tool holder according to claim 4, and further comprising means for connecting together the sleeve body and the shank in a region of the flange.

12. A tool holder according to claim 11, wherein the connecting means includes a threaded connection between the shank and the sleeve body.

13. A tool holder according to claim 4, wherein the force exerting means includes an engagement part arranged at a rear end of the clamping bolt and to which an external clamping device is engagable.

14. A tool holder according to claim 13, wherein the clamping bolt is arranged to extend into a hollow space in the shank.

15. A tool holder according to claim 14, wherein the clamping bolt has a channel for conveying a fluid, the shank also having a channel aligned with the channel in the clamping bolt, and further comprising packing means arranged between the clamping bolt and the shank for preventing fluid leakage.

16. A tool holder according to claim 4, wherein the clamping element is a set of Belleville springs.

17. A tool holder according to claim 4, wherein a plurality of clamping elements are distributed at regular angular distances over the circumference of the clamping bolt.

18. A tool holder according to claim 19, and further comprising spring means for acting on the abutment in an unclamping direction of the clamping elements.

19. A tool holder according to claim 3, wherein the front part includes a flange part, the flange being formed by the flange part of the sleeve body and the flange part of the front part.

20. A tool holder according to claim 17, and further comprising screw means for attaching the flange parts together.

21. A tool holder according to claim 17, wherein the flange parts are welded together.

22. A tool holder according to claim 17, wherein the flange parts are bonded together.

23. A tool holder according to claim 17, and further comprising an intermediate layer of damping material provided between the flange parts.

24. A tool holder according to claim 4, wherein the flange includes a flange part connected to the front part and a flange part connected to the sleeve body, the flange part of the sleeve body and the flange part of the front part being connected together to form the flange.

25. A tool holder according to claim 24, and further comprising an intermediate layer of damping material provided between the flange parts.

26. A tool holder according to claim 1, wherein the sleeve body is conically shaped.

27. A tool holder according to claim 22, wherein the sleeve body is shaped as an ordinary steep cone.

* * * * *